United States Patent
Li et al.

(10) Patent No.: US 10,880,225 B2
(45) Date of Patent: Dec. 29, 2020

(54) RING BUS AND CREDIT ALLOCATION METHOD

(71) Applicant: Shanghai Zhaoxin Semiconductor Co., Ltd., Shanghai (CN)

(72) Inventors: Ranyue Li, Shanghai (CN); Jie Jin, Shanghai (CN); Xiaolong Zhang, Shanghai (CN); Junping Li, Shanghai (CN); Mintao Tang, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 89 days.

(21) Appl. No.: 16/283,830

(22) Filed: Feb. 25, 2019

(65) Prior Publication Data

US 2020/0244587 A1 Jul. 30, 2020

(30) Foreign Application Priority Data

Jan. 25, 2019 (CN) .......................... 2019 1 0074825

(51) Int. Cl.
*H04L 12/801* (2013.01)
*G06F 13/22* (2006.01)
*H04L 12/423* (2006.01)

(52) U.S. Cl.
CPC .............. *H04L 47/39* (2013.01); *G06F 13/22* (2013.01); *H04L 12/423* (2013.01)

(58) Field of Classification Search
CPC ....... H04L 12/423; H04L 47/39; H04L 12/42; G06F 13/22
See application file for complete search history.

(56) References Cited

U.S. PATENT DOCUMENTS

| 7,712,006 | B1 * | 5/2010 | Miller | ................. G06F 13/4273 |
| | | | | 714/753 |
| 9,720,483 | B2 * | 8/2017 | Hiraoka | ................. G06F 1/3215 |

* cited by examiner

*Primary Examiner* — El Hadji M Sall
(74) *Attorney, Agent, or Firm* — JCIPRNET

(57) ABSTRACT

A ring bus and a credit allocation method are provided. The ring bus includes a slave module and multiple master modules. The slave module includes an injection table and a state table, and is configured to generate a credit signal including a node identity and an active code. The master modules are coupled to the slave module to form a ring path. The slave module determines whether the credit signal is a newly injected credit signal, and determines the node identity of the credit signal according to the injection table or the state table. The slave module transmits the credit signal to the master module corresponding to the node identity through the ring path according to the node identity. The slave module uses a corresponding idle entry to receive a credit request signal provided by the master device consuming a credit of the credit signal.

20 Claims, 4 Drawing Sheets

RING BUS AND CREDIT ALLOCATION METHOD

CROSS-REFERENCE TO RELATED APPLICATION

This application claims the priority benefit of China application serial no. 201910074825.0, filed on Jan. 25, 2019. The entirety of the above-mentioned patent application is hereby incorporated by reference herein and made a part of this specification.

BACKGROUND OF THE DISCLOSURE

Field of the Disclosure

The disclosure relates to a bus, and particularly relates to a ring bus and a credit allocation method.

Description of Related Art

On a unidirectional ring bus without a data buffer function, in order to avoid data loss, a slave serving as a receiving end needs to guarantee that after one of nodes of a plurality of masters serving as transmitting ends sends a credit request, the slave serving as the receiving end must have an idle entry to receive the credit request. Therefore, in a conventional ring bus mechanism, the slave serving as the receiving end may inject a credit signal to the ring bus according to the number of the idle entries of itself. If a certain master on the ring bus is about to send the credit request to the slave, such master is required to first receive the credit signal sent by the slave.

The conventional ring bus adopts a probabilistic method to send the credit signal, and sets a pseudo random generator (RAND) in each of the masters, and outputs a valid signal according to a certain probability, so as to determine whether a next master may obtain the credit signal. However, in a framework of the conventional ring bus, when some of the master modules work, but some do not work, the probability for each of the masters obtaining the credit signal will be unfair, and the probability that the credit signal rounds the ring bus in blank becomes very high, and the credit signal cannot be quickly obtained by the master having the credit request, which causes a waste of system bandwidth. Therefore, solutions of several embodiments are provided below.

SUMMARY OF THE DISCLOSURE

The disclosure is directed to a ring bus and a credit allocation method, which are adapted to correctly and fairly allocate a credit of a credit signal.

The disclosure provides a ring bus including a slave module and a plurality of master modules. The slave module includes an injection table and a state table, and is configured to generate a credit signal. The credit signal includes a node identity and an active code. The master modules are coupled to the slave module to form a ring path. The slave module determines whether the credit signal is a newly injected credit signal, and determines the node identity of the credit signal according to the injection table or the state table. The slave module transmits the credit signal to the master module corresponding to the node identity through the ring path according to the node identity. When the master module corresponding to the node identity has a credit request, the master module consumes a credit of the credit signal, and the slave module uses a corresponding idle entry to receive a credit request signal provided by the master device consuming the credit of the credit signal.

The disclosure provides a credit allocation method adapted to a ring bus. The ring bus includes a plurality of master modules and a slave module. The credit allocation method includes following steps: generating a credit signal by the slave module, where the credit signal includes a node identity and an active code; determining whether the credit signal is a newly injected credit signal by the slave module, so as to determine the node identity of the credit signal according to a injection table or a state table; transmitting the credit signal to the master module corresponding to the node identity through a ring path according to the node identity by the slave module; when the master module corresponding to the node identity has a credit request, consuming a credit of the credit signal by the master module; and using a corresponding idle entry by the slave module to receive a credit request signal provided by the master device consuming the credit of the credit signal.

Based on the above description, in the ring bus and the credit allocation method of the disclosure, when the slave module injects or outputs the credit signal to the master modules, the node identity of the credit signal is determined according to the injection table and the state table set in the slave module, such that the credit of the credit signal may be correctly and fairly allocated to a plurality of the master modules.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
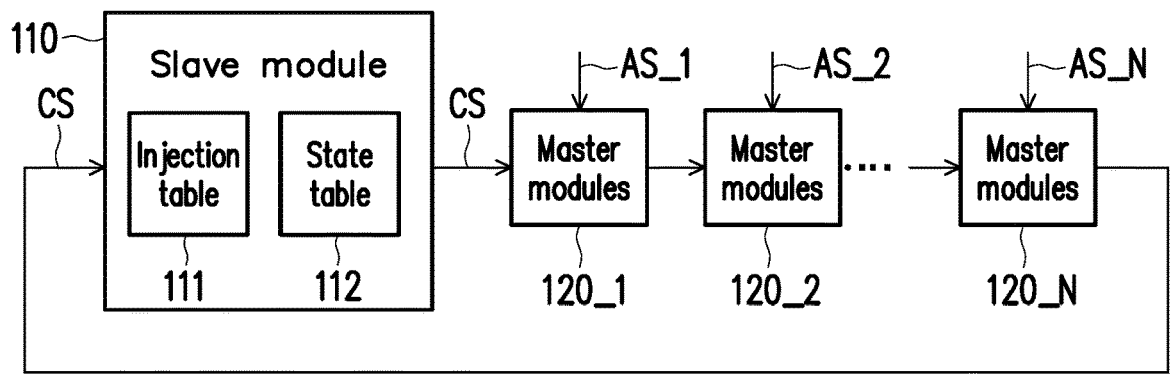
FIG. 1 is a functional block diagram of a ring bus according to an embodiment of the disclosure.

Reference will now be made in detail to the preferred embodiments of the disclosure, examples of which are illustrated in the accompanying drawings. Wherever possible, the same reference numbers are used in the drawings and the description to refer to the same or like parts.

FIG. 1 is a functional block diagram of a ring bus according to an embodiment of the disclosure. Referring to FIG. 1, the ring bus 100 includes a slave module 110 and a plurality of master modules 120_1-120_N, where N is a positive integer greater than 0. The slave module 110 includes an injection table 111 and a state table 112. The slave module 110 is coupled to the master modules 120_1-120_N to form a ring path. The ring bus 100 is, for example, applied in a central processing unit (CPU) framework. The slave module 110 is, for example, a main memory, and the master modules 120_1-120_N are, for example, a plurality of CPU cores, though the disclosure is not limited thereto.

In the embodiment, when a memory space of the slave module 110 does not have an idle entry, the slave module 110 may output a credit signal CS with an invalid identity (ID) for transmitting in the ring bus 100. Moreover, when the memory space of the slave module 110 has the idle entry, the slave module 110 may newly inject a credit signal CS with a valid ID to the ring bus 100 to pass through the master modules 120_1-120_N in a loop manner until one of the master modules 120_1-120_N consumes a credit of the credit signal CS. Therefore, the slave module 110 may correspondingly receive a credit request signal provided by the master module consuming the credit of the credit signal CS. In the embodiment, the master modules 120_1-120_N may receive use signals AS_1-AS_N to determine whether the master modules 120_1-120_N have a credit request. Those skilled in the art may set the use signals AS_1-AS_N to "0" for representing none credit request, and set the use signals to "1" for representing having credit request, though the disclosure is not limited thereto.

In the embodiment, the credit signal CS includes a node ID and an active code. The master modules 120_1-120_N include a plurality of device IDs and the node ID of the credit signal CS may correspond to one of the device IDs. In the embodiment, each of the master modules 120_1-120_N may include a comparator. When the credit signal CS is transmitted to pass through the master modules 120_1-120_N, the comparators of the master modules 120_1-120_N may compare whether the device IDs are the same with the node ID of the credit signal CS, and one of the master modules 120_1-120_N that has the device ID the same with the node ID of the credit signal CS may consume the credit of the credit signal CS. In the embodiment, one of the master modules 120_1-120_N that consumes the credit of the credit signal CS may change the active code in the credit signal CS from a first coding state (for example, "1") to a second coding state (for example, "0"), and the node ID of the credit signal is maintained unchanged. Therefore, when the credit signal CS is transmitted back to the slave module 110, the slave module 110 may accurately learn the device ID of one of the master modules 120_1-120_N that consumes the credit of the credit signal CS by determining whether the active code of the credit signal CS is the second coding state. Then, one of the master modules 120_1-120_N may send the credit request signal to the slave module 110, and the slave module 110 may store the credit request signal by using the idle entry.

In the embodiment, regardless of the credit signal newly injected by the slave module 110 or the credit signal transmitted to pass through the slave module 110, the node ID therein is all renumbered by the slave module 110. In the embodiment, the slave module 110 may determine the node ID of the credit signal CS according to the injection table 111 and the state table 112. Moreover, in an embodiment, the slave module 110 may further include a counter and a pointer to sequentially point the node ID of the credit signal CS to the IDs in the injection table 111 or the state table 112, though the disclosure is not limited thereto. Taking 8 master modules as an example, the injection table 111 has a form of a following table 1. In the embodiment, when the credit signal CS is a newly injected credit signal, the slave module 110 may determine the node ID of the credit signal CS according to a sequence of the node IDs of the injection table 111 (the following table 1), such that the credit signal CS sequentially polls the master modules 120_1-120_8.

TABLE 1

| Node ID |
| --- |
| credit_node_1 |
| credit_node_2 |
| credit_node_3 |
| credit_node_4 |
| credit_node_5 |
| credit_node_6 |
| credit_node_7 |
| credit_node_8 |

For example, when slave module 110 outputs the credit signal CS with valid ID and having the node ID of "credit_node_1", if the use signal AS_1 received by the master module 120_1 does not allow the master module 120_1 to consume the credit of the credit signal CS, the node ID of the credit signal CS is maintained to "credit_node_1" without changing, and the active code is still set to the first coding state. Therefore, when the credit signal CS is transmitted back to the slave module 110, the slave module 110 may renumber the node ID of the credit signal CS according to a state table 112 of a following table 2. For example, when the node ID of the credit signal CS is numbered to "credit_node_2" according to the state table of the table 2, if the use signal AS_2 received by the master module 120_2 allows the master module 120_2 to consume the credit of the credit signal CS, the node ID of the credit signal CS of "credit_node_2" is maintained unchanged, and the active code is set as the second coding state. Therefore, when the credit signal CS is transmitted back to the slave module 110, the slave module 110 may learn that the master module 120_2 has the credit request. The above node numbering process is an example for better understanding of the disclosure, and an actual node numbering process is not limited thereto. In another embodiment, the node ID of the credit signal CS is determined according to a state code.

Taking the 8 master modules as an example, the state table 112 is, for example, in form of the following table 2. In the embodiment, when the credit signal CS is a non-newly injected credit signal, the slave module 110 may determine the node ID of the credit signal CS according to the state codes of the state table 112, such that the credit signal CS polls at least one of the master modules 120_1-120_8.

TABLE 2

| Node ID | State code |
| --- | --- |
| credit_node_1 | 1 |
| credit_node_2 | 1 |
| credit_node_3 | 0 |
| credit_node_4 | 1 |
| credit_node_5 | 0 |
| credit_node_6 | 1 |
| credit_node_7 | 1 |
| credit_node_8 | 1 |

It should be noted that during the process that the slave module 110 outputs the credit signal CS according to the injection table 111 to poll the master modules 120_1-120_8, if the credit of the credit signal CS is consumed, the slave module 110 may correspondingly set the state code of the state table 112. In the embodiment, when one of the master modules 120_1-120_8 consumes the credit of the credit signal CS, the slave module 110 sets the state code corresponding to the node ID in the state table 112 as the second coding state ("0"). When the master modules 120_1-120_8 do not consume the credit of the credit signal CS, the slave module 110 sets the state code corresponding to the node ID in the state table 112 as the first coding state ("1"). Therefore, after the slave module 110 first polls the master modules 120_1-120_8 according to the injection table 111, it is learned which of the master modules 120_1-120_8 has a higher chance of having the credit request. Then, the slave module 110 polls at least one of the master modules 120_1-120_8 with the higher chance of having the credit request according to the state table 112. In other words, taking the above table 2 as an example, when the credit signal CS is a non-newly injected credit signal, the slave module 110 determines the node ID of the credit signal CS according to the state codes in the state table 112 (the above table 2), such that the credit signal CS only pools the master modules 120_3, 120_5 (with the state code of "0"). Therefore, the ring bus 100 may effectively allocate the credit to the master modules 120_3, 120_5 actually having the credit request, and reduce polling of the other master modules (with the state code of "1") without the credit request, so as to reduce the number of blank rounds of the credit signal CS and improve efficiency. For example, as shown in the above table 1 and table 2, when the slave module 110 outputs the credit signal CS with the valid ID and having the node ID of "credit_node_1", if the use signal AS_1 received by the master module 120_1 does not allow the master module 120_1 to consume the credit of the credit signal CS, the node ID of the credit signal CS is maintained as "credit_node_1" without changing, and the active code is still set to the first coding state ("1") and is transmitted back to the slave module 110. The slave module 110 determines the state code of the node ID "credit_node_2" as the first coding state ("1") according to the state table 112 (the above table 2), and renumbers the node ID "credit_node_1" transmitted back to the slave module 110 to "credit_node_3" according to the state table 112 (the above table 2), and uploads the credit signal containing the node ID "credit_node_3" to the ring path to poll the corresponding master modules 120_1-120_8.

Moreover, during the process that the credit signal CS polls the master modules 120_1-120_8, when one of the master modules 120_1-120_8 consumes the credit of the credit signal CS, the node ID of the credit signal CS is maintained unchanged, and after the credit signal CS is transmitted back to the slave module 110, the slave module 110 looks up the state code corresponding to the node ID in the state table 112. If the state code of the node ID is the first coding state ("1"), the state code of the node ID is changed to the second coding state ("0").

Moreover, when the credit signal CS is the non-newly injected credit signal, and each of the state codes in the state table 112 is the first coding state ("1"), the slave module 110 again determines the node ID of the credit signal CS according to the above injection table 111, so that the credit signal CS may re-poll the master modules 120_1-120_8 until the master module with the credit request appears.

However, in an embodiment, taking the node ID of "credit_node_3" as an example, the state table 112 may also be in form of a following table 3. The state table 112 may further include a state counting value (the state counting value is, for example, 2, and a predetermined state counting value is 1) and a counting threshold (the counting threshold is, for example, 5, and a predetermined counting threshold is 4). For example, when the credit signal CS is the non-newly injected credit signal, and the node ID of the credit signal CS is "credit_node_3", if the use signal AS_3 received by the master module 120_3 does not allow the master module 120_3 to consume the credit of the credit signal CS, the slave module 110 adds the state counting value of the table 3 by 1 (for example, 2+1=3), and subtracts the counting threshold of the table 3 by 1 (for example, 5−1=4). Conversely, if the use signal AS_3 received by the master module 120_3 allows the master module 120_3 to consume the credit of the credit signal CS, the slave module 110 maintains the state counting value of the table 3 unchanged (for example, 2), and adds the counting threshold of the table 3 by 2 (for example, 5+2=7). Those with ordinary skills in the art may configure value ranges of different state counting values and counting thresholds according to specific applications, for example, if the use signal AS_3 received by the master module 120_3 allows the master module 120_3 to consume the credit of the credit signal CS, the slave module 110 may update the state counting value of the table 3 to "0". However, the above description is for interpretation only, so that the technicians of the filed may understand the disclosure better, however, the disclosure is not limited thereto.

In an embodiment, only when the state counting value is greater than the counting threshold, the slave module 110 sets the state code corresponding to the node ID of "credit_node_3" to the first coding state ("1"). The slave module 110 may adaptively adjust the counting threshold, and an amplitude that the slave module 110 increases the counting threshold is greater than an amplitude that the slave module 110 decreases the counting threshold. In other words, the ring bus 100 makes the state codes of the master modules without the credit request to be quickly set to the first coding state ("1"), and the state code of the master module with the credit request is not easy to be quickly set to the first coding state ("1"). Therefore, the ring bus 100 may effectively prevent the state code from being frequently set to the first coding state ("1"). Moreover, the above state counting value may have a highest limit value (for example, 9) and a lowest limit value (for example, 1). When the above state counting value is adjusted to be greater than the highest limit value, the state counting value is maintained to the highest limit value. When the above state counting value is adjusted to be smaller than or equal to the lowest limit value, the state counting value is maintained to the lowest limit value.

TABLE 3

| Node ID | State code | State counting value | Counting threshold |
| --- | --- | --- | --- |
| credit_node_3 | 0 | 2 | 5 |

Figure 2:
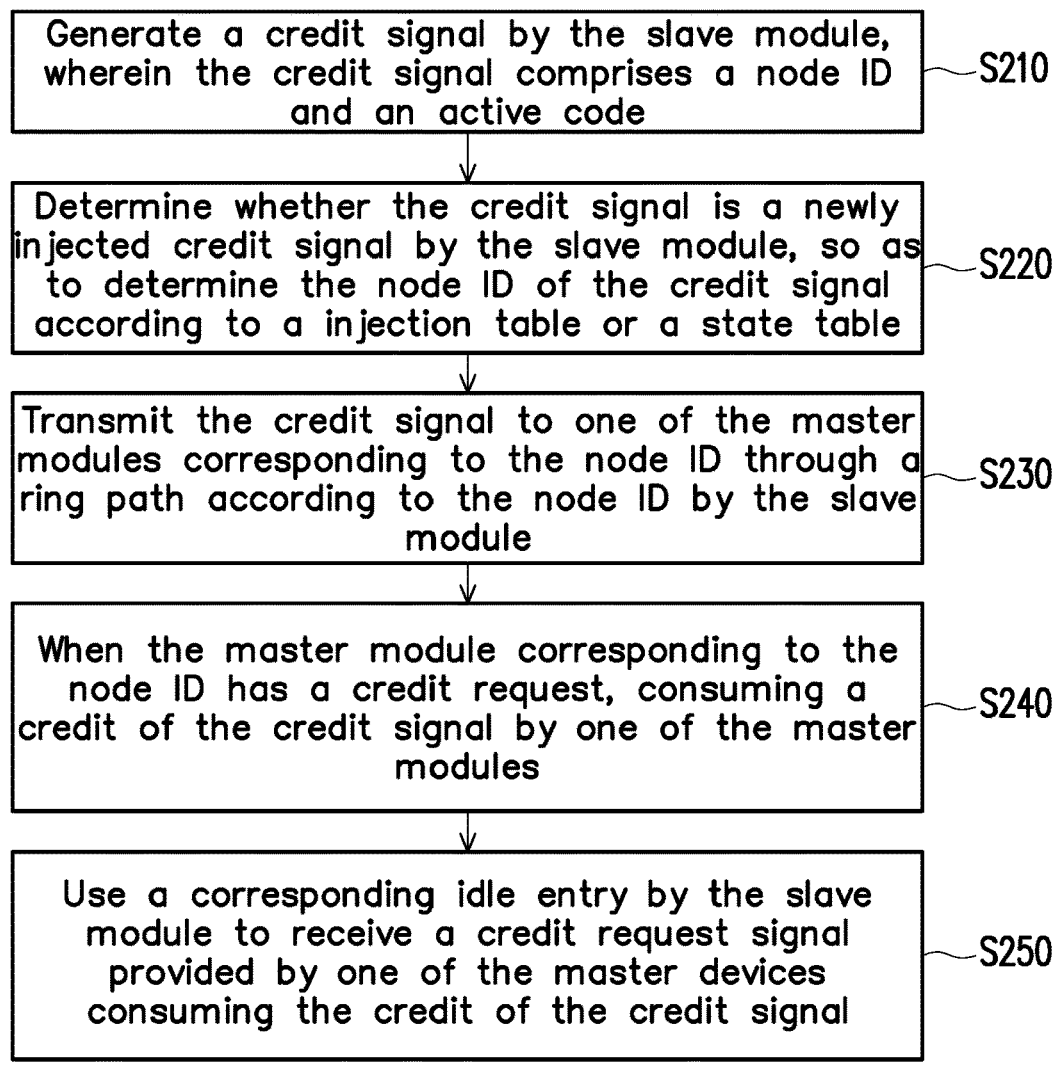
FIG. 2 is a flowchart illustrating a credit allocation method according to an embodiment of the disclosure.

FIG. 2 is a flowchart illustrating a credit allocation method according to an embodiment of the disclosure. Referring to FIG. 1 and FIG. 2, the ring bus 100 of FIG. 1 may execute the credit allocation method of FIG. 2. In step S210, the slave module 110 generates the credit signal CS, where the credit signal CS includes a node ID and an active code. In step S220, the slave module 110 determines whether the credit signal is a newly injected credit signal, so as to determine the node ID of the credit signal CS according to the injection table 111 or the state table 112. In step S230, the slave module transmits the credit signal CS to one of the master modules 120_1-120_N corresponding to the node ID through a ring path according to the node ID. In step S240, when one of the master modules 120_1-120_N corresponding to the node ID has a credit request, the one of the master modules 120_1-120_N consumes a credit of the credit signal CS. In step S250, the slave module 110 uses a corresponding idle entry to receive a credit request signal provided by the one of the master modules 120_1-120_N consuming the credit of the credit signal CS. Therefore, the credit allocation method of the disclosure may correctly and fairly allocate the credit of the credit signal.

Moreover, enough instructions and recommendations for further implementation details and technical features of the above ring bus 100 may be learned by referring to the description of the embodiment of FIG. 1, and details thereof are not repeated.

Figure 3A:
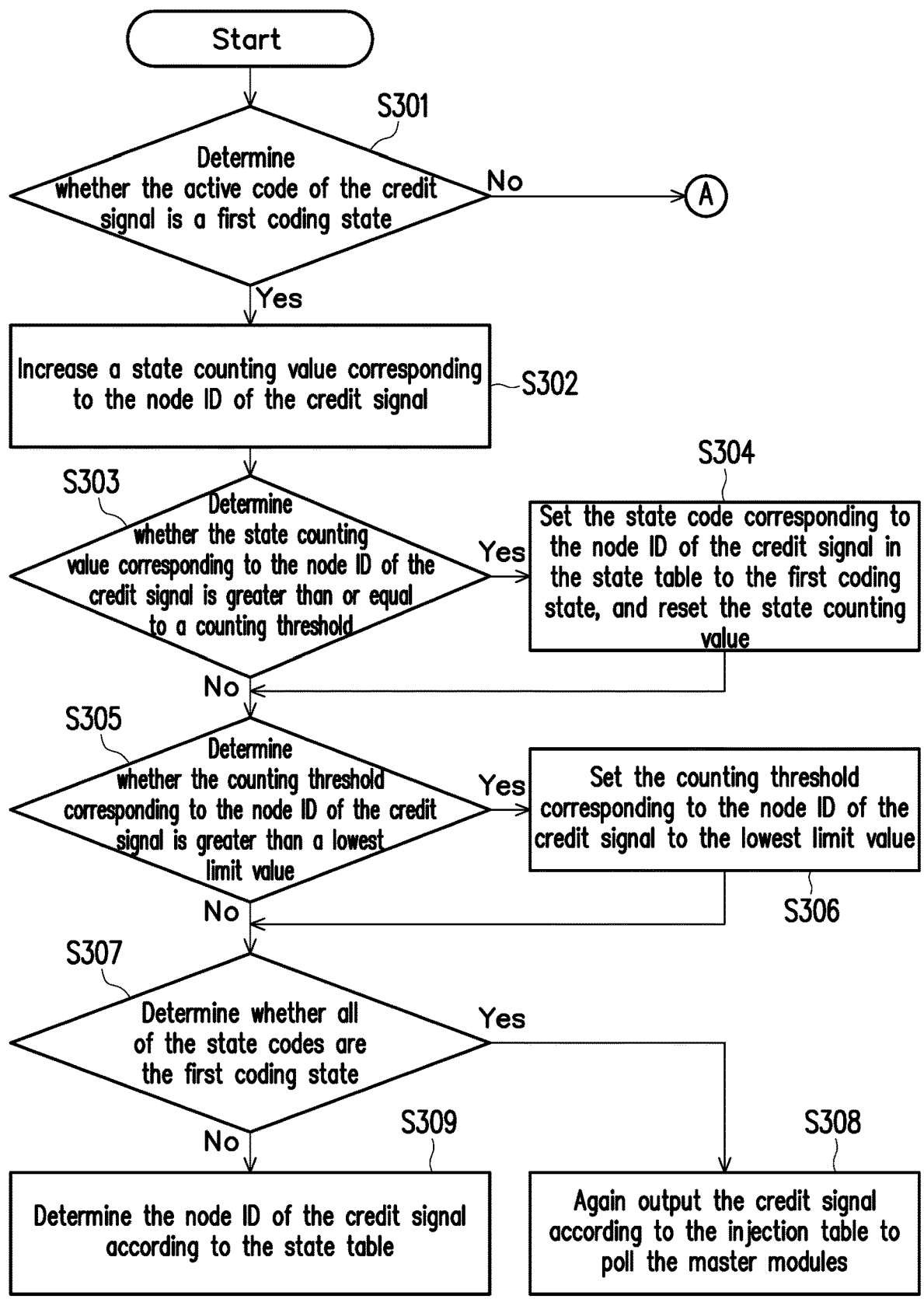
FIG. 3A and FIG. 3B are operation flowcharts of a slave module according to an embodiment of the disclosure.
Figure 3B:
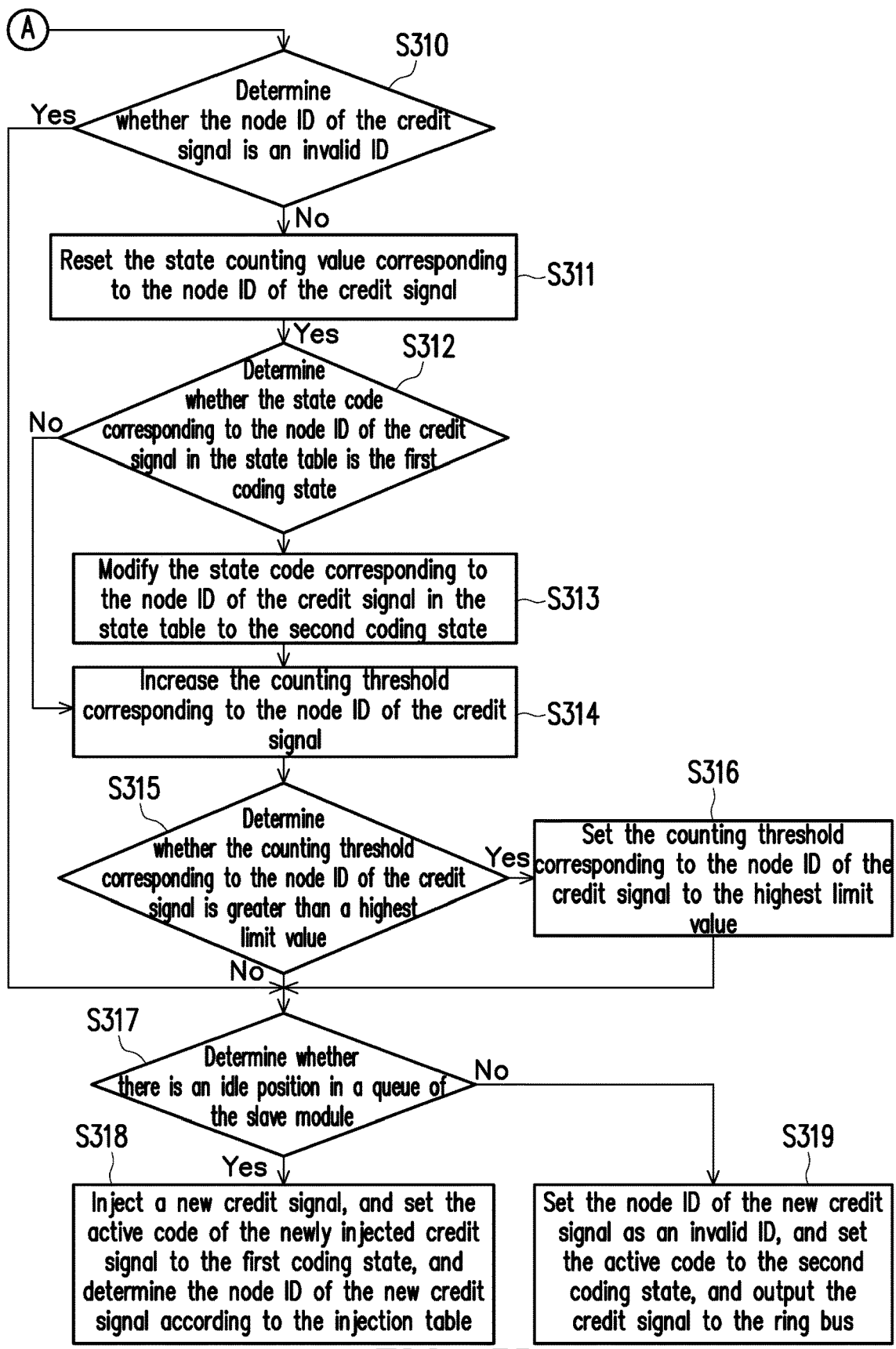

FIG. 3A and FIG. 3B are operation flowcharts of a slave module according to an embodiment of the disclosure. Referring to FIG. 1, FIG. 3A and FIG. 3B, the slave module 110 may execute the operation flow of FIG. 3A and FIG. 3B. In step S301, the slave module 110 determines whether the active code of the credit signal CS is the first coding state. If yes, it represents that the master device corresponding to the node ID of the current credit signal CS does not consume the credit of the credit signal CS. Therefore, the slave module 110 executes step S302. In step S302, the slave module 110 increases the state counting value corresponding to the node ID of the credit signal CS. In step S303, the slave module 110 determines whether the state counting value corresponding to the node ID of the credit signal CS is greater than or equal to the counting threshold. If yes, the slave module 110 executes step S304. In step S304, the slave module 110 sets the state code corresponding to the node ID of the credit signal CS in the state table 112 to the first coding state, and resets the state counting value. If not, the slave module 110 executes step S305. In step S305, the slave module 110 determines whether the counting threshold corresponding to the node ID of the credit signal CS is greater than the lowest limit value.

If a determination result of step S305 is affirmative, the slave module 110 executes step S306. In step S306, the slave module 110 sets the counting threshold corresponding to the node ID of the credit signal CS to the lowest limit value. If not, the slave module 110 executes step S307. In step S307, the slave module 110 determines whether all of the state codes are the first coding state. If yes, the slave module 110 executes step S308. In step S308, the slave module 110 again output the credit signal CS according to the injection table 111 to poll the master modules. If not, the slave module 110 executes step S309. In step S309, the slave module 110 determines the node ID of the credit signal CS according to the state table 112, so as to effectively provide the credit signal CS to the master module with the credit request.

If a determination result of step S301 is no, the slave module 110 executes step S310. In step S310, the slave module 110 determines whether the node ID of the credit signal CS is an invalid ID. If not, the slave module 110 executes step S311. In step S311, the slave module 110 resets the state counting value corresponding to the node ID of the credit signal CS. In step S312, the slave module 110 determines whether the state code corresponding to the node ID of the credit signal CS in the state table 112 is the first coding state. If yes, the slave module 110 executes step S313. In step S313, the slave module 110 modifies the state code corresponding to the node ID of the credit signal CS in the state table 112 to the second coding state. In step S314, the slave module 110 increases the counting threshold corresponding to the node ID of the credit signal CS. Moreover, if a determination result of the step S312 is no, the slave module 110 directly executes step S314.

In step S315, the slave module 110 determines whether the counting threshold corresponding to the node ID of the credit signal CS is greater than the highest limit value. If yes, the slave module 110 executes step S316. In step S316, the slave module 110 sets the counting threshold corresponding to the node ID of the credit signal CS to the highest limit value. If not, the slave module 110 executes step S317. Moreover, if the determination result of the step S310 is affirmative, the slave module 110 directly executes step S317. In step S317, the slave module 110 determines whether there is an idle position in a queue of the slave module 110. If yes, the slave module 110 executes step S318. In step S318, the slave module 110 injects a new credit signal, and sets the active code of the newly injected credit signal to the first coding state, and determines the node ID of the new credit signal according to the injection table 111. If not, the slave module 110 executes step S319. In step S319, the slave module 110 sets the node ID of the new credit signal as an invalid ID, and sets the active code to the second coding state, and outputs the credit signal with the invalid ID to the ring bus 100.

Moreover, the situation that the node ID of the credit signal is the invalid ID refers to that there is no credit request in the current ring bus 100, and when the queue of the slave module 110 has the idle position, the slave module 110 may newly inject one credit signal with a specific node ID to the ring bus 100 according to the injection table 111. Conversely, when the queue of the slave module 110 does not have the idle position, the slave module 110 transmits a credit signal with the invalid ID to the ring bus 100. Therefore, the slave module 110 of the embodiment may correctly and fairly allocate the credit of the credit signal to the master modules 120_1-120_N.

Figure 4:
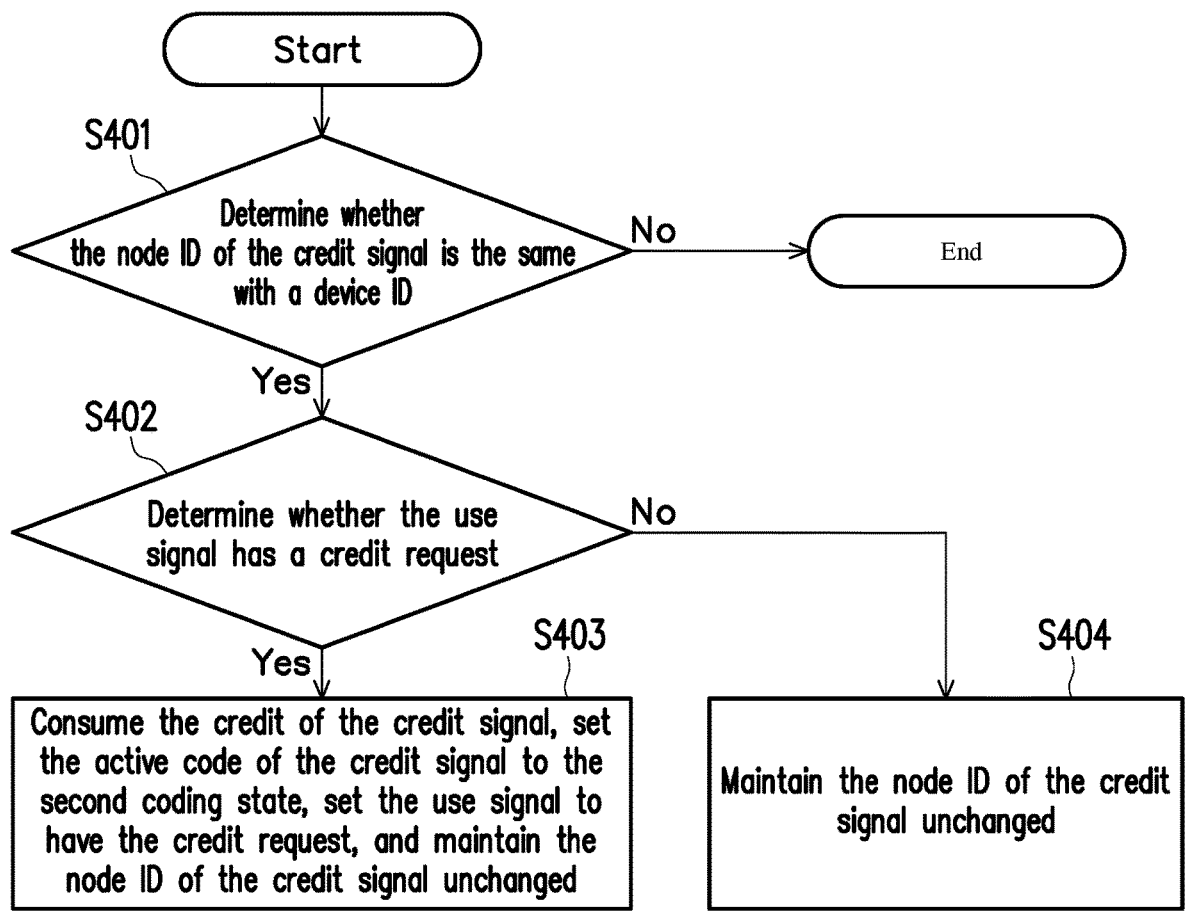
FIG. 4 is an operation flowchart of a master module according to an embodiment of the disclosure.

FIG. 4 is an operation flowchart of a master module according to an embodiment of the disclosure. Referring to FIG. 1 and FIG. 4, any one of the master modules 120_1-120_N may execute an operation flow of FIG. 4. Taking the master module 120_1 as an example, in step S401, the master module 120_1 determines whether the node ID of the credit signal is the same with a device ID. If not, the master module 120_1 ends the operation, and transmits the credit signal to the next master module 120_2. If yes, the master module 120_1 executes step S402. In step S402, the master module 120_1 determines whether the use signal AS_1 has a credit request. If yes, the master module 120_1 executes step S403. In step S403, the master module 120_1 consumes the credit of the credit signal, sets the active code of the credit signal to the second coding state, sets the use signal AS_1 to have the credit request (for example, "1"), and maintains the node ID of the credit signal unchanged. The master module 120_1 transmits the credit signal to the next master module 120_2. Conversely, if a determination result of the step S402 is no, the master module 120_1 executes step S404. In step S404, the master module 120_1 maintains the node ID of the credit signal unchanged, and transmits the credit signal to the next master modules 120_2-120_N, and transmits back to the slave module. A processing flow of transmitting back the credit signal of the master modules 120_1-120_N to the slave module 110 has been described in detail in processing of the slave module, and detail thereof is not repeated. Similarly, the master modules 120_2-120_N may also execute the above operation flow. Therefore, the master modules 120_1-120_N of the embodiment may correctly consume the credit of the credit signal.

In summary, in the ring bus and the credit allocation method of the disclosure, by configuring the injection table and the state table in the slave module, the slave module may determine to adopt the injection table or the state table to set the node ID of the credit signal according to whether the credit signal currently transmitted to the ring bus is the newly injected credit signal. The slave module may sequentially poll a plurality of the master modules in the ring bus according to the injection table, or may determine whether to poll at least one of the plurality of master modules in the ring bus according to the state codes corresponding to different node IDs in the state table. Moreover, the state table may be further configured with the state counting value and the counting threshold to determine whether to adjust the state code, and by adaptively adjusting the counting threshold, polling of the master modules without the credit request by the credit signal is reduced, and polling of the master modules with the credit request is increased. In this way, the ring bus and the credit allocation method of the disclosure may correctly and fairly allocate the credit of the credit signal.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A ring bus, comprising:
   a slave module, comprising an injection table and a state table, and configured to generate a credit signal, wherein the credit signal comprises a node identity and an active code; and
   a plurality of master modules, coupled to the slave module to form a ring path, wherein the credit signal sequentially polls the plurality of master modules until one of the plurality of master modules consumes a credit of the credit signal to transmit back the credit signal to the slave module,
   wherein the slave module determines whether the credit signal is a newly injected credit signal, and determines the node identity of the credit signal according to the injection table or the state table,
   wherein the slave module transmits the credit signal to the master module corresponding to the node identity through the ring path according to the node identity, and when the master module corresponding to the node identity has a credit request, the master module consumes the credit of the credit signal, and the slave module uses a corresponding idle entry to receive a credit request signal provided by the master device consuming the credit of the credit signal.

2. The ring bus as claimed in claim 1, wherein when one of the plurality of master modules consumes the credit of the credit signal, the one of the plurality of master modules sets the active code to a second coding state, such that when the credit signal is transmitted back to the slave module and the slave module determines that the active code of the credit signal is the second coding state, the slave module uses the corresponding idle entry to receive the credit request signal provided by the master module consuming the credit of the credit signal.

3. The ring bus as claimed in claim 1, wherein the master module corresponding to the node identity does not consume the credit of the credit signal, and the credit signal is transmitted back to the slave module through the ring path, the slave module renumbers the node identity of the credit signal according to state codes corresponding to a plurality of different node identities in the state table, so as to re-transmit the credit signal to another one of the plurality of master modules corresponding to the next node identity through the ring path.

4. The ring bus as claimed in claim 1, wherein the plurality of master modules respectively comprise a comparator and a device identity, wherein when the credit signal is transmitted to pass through one of the plurality of master modules, the comparator of the one of the plurality of master modules is configured to compare whether the device identity is the same with the node identity, so that the one of the plurality of master modules consumes the credit of the credit signal.

5. The ring bus as claimed in claim 1, wherein when the credit signal is the newly injected credit signal, the slave module determines the node identity of the credit signal according to the injection table, such that the credit signal sequentially polls the plurality of master modules,
   wherein when the credit signal is a non-newly injected credit signal, the slave module determines the node identity of the credit signal according to the state table, such that the credit signal polls at least one of the plurality of master modules.

6. The ring bus as claimed in claim 5, wherein when one of the plurality of master modules consumes the credit of the credit signal, the slave module sets a state code corresponding to the node identity in the state table to the second coding state, wherein when the one of the plurality of master modules does not consume the credit of the credit signal, the slave module sets the state code corresponding to the node identity in the state table to a first coding state.

7. The ring bus as claimed in claim 6, wherein when the credit signal is the non-newly injected credit signal, and each state code in the state table is the first coding state, the slave module again determines the node identity of the credit signal according to the injection table, such that the credit signal re-polls the plurality of master modules.

8. The ring bus as claimed in claim 6, wherein the state code corresponds to a state counting value, and when the one of the plurality of master modules does not consume the credit of the credit signal, the slave module increases the state counting value, and determines whether the state counting value is greater than a counting threshold, so as to set the state code to the first coding state.

9. The ring bus as claimed in claim 8, wherein when the one of the plurality of master modules consumes the credit of the credit signal, the slave module increases the counting threshold corresponding to the state counting value of the one of the plurality of master modules,
   wherein when the one of the plurality of master modules does not consume the credit of the credit signal, the slave module decreases the counting threshold corresponding to the state counting value of the one of the plurality of master modules.

10. The ring bus as claimed in claim 9, wherein an amplitude that the slave module increases the counting threshold is greater than an amplitude that the slave module decreases the counting threshold.

11. A credit allocation method, adapted to a ring bus, wherein the ring bus comprises a plurality of master modules and a slave module, the credit allocation method comprising:
    generating a credit signal by the slave module, wherein the credit signal comprises a node identity and an active code;
    sequentially polling the plurality of master modules by the credit signal until one of the plurality of master modules consumes a credit of the credit signal to transmit back the credit signal to the slave module;
    determining whether the credit signal is a newly injected credit signal by the slave module, so as to determine the node identity of the credit signal according to a injection table or a state table;

transmitting the credit signal to one of the plurality of master modules corresponding to the node identity through a ring path according to the node identity by the slave module;

when the master module corresponding to the node identity has a credit request, consuming the credit of the credit signal by the master module; and using a corresponding idle entry by the slave module to receive a credit request signal provided by the master module consuming the credit of the credit signal.

12. The credit allocation method as claimed in claim 11, wherein when one of the plurality of master modules consumes the credit of the credit signal, the one of the plurality of master modules sets the active code to a second coding state, wherein the step of using the corresponding idle entry by the slave module to receive the credit request signal provided by the master module consuming the credit of the credit signal comprises:

when the credit signal is transmitted back to the slave module and the slave module determines that the active code of the credit signal is the second coding state, using the corresponding idle entry by the slave module to receive the credit request signal provided by the master module consuming the credit of the credit signal.

13. The credit allocation method as claimed in claim 11, further comprising:

when one of the plurality of master modules corresponding to the node identity does not consume the credit of the credit signal, and the credit signal is transmitted back to the slave module through the ring path, renumbering the node identity of the credit signal by the slave module according to state codes corresponding to a plurality of different node identities in the state table, so as to re-transmit the credit signal to another one of the plurality of master modules corresponding to the next node identity through the ring path.

14. The credit allocation method as claimed in claim 11, wherein the plurality of master modules respectively comprise a comparator and a device identity, and the step of consuming a credit of the credit signal by one of the plurality of master modules when the one of the plurality of master modules corresponding to the node identity has the credit request comprises when the credit signal is transmitted to pass through one of the plurality of master modules, comparing whether the device identity is the same with the node identity by the comparator of the one of the plurality of master modules, so that the one of the plurality of master modules consumes the credit of the credit signal.

15. The credit allocation method as claimed in claim 11, wherein the step of determining whether the credit signal is the newly injected credit signal by the slave module, so as to determine the node identity of the credit signal according to the injection table or the state table comprises:

when the credit signal is the newly injected credit signal, determining the node identity of the credit signal by the slave module according to the injection table, such that the credit signal sequentially polls the plurality of master modules; and when the credit signal is a non-newly injected credit signal, determining the node identity of the credit signal by the slave module according to the state table, such that the credit signal polls at least one of the plurality of master modules.

16. The credit allocation method as claimed in claim 15, further comprising:

when one of the plurality of master modules consumes the credit of the credit signal, setting a state code corresponding to the node identity in the state table to the second coding state by the slave module; and when the one of the plurality of master modules does not consume the credit of the credit signal, setting the state code corresponding to the node identity in the state table to a first coding state by the slave module.

17. The credit allocation method as claimed in claim 16, further comprising:

when the credit signal is the non-newly injected credit signal, and each state code in the state table is the first coding state, again determining the node identity of the credit signal by the slave module according to the injection table, such that the credit signal re-polls the plurality of master modules.

18. The credit allocation method as claimed in claim 16, wherein the state code corresponds to a state counting value, and the step of setting the state code corresponding to the node identity in the state table to the first coding state by the slave module when the one of the plurality of master modules does not consume the credit of the credit signal comprises:

when the one of the plurality of master modules does not consume the credit of the credit signal, increasing the state counting value by the slave module, and determining whether the state counting value is greater than a counting threshold, so as to set the state code to the first coding state.

19. The credit allocation method as claimed in claim 18, further comprising:

wherein when the one of the plurality of master modules consumes the credit of the credit signal, increasing the counting threshold corresponding to the state counting value of the one of the plurality of master modules by the slave module; and when the one of the plurality of master modules does not consume the credit of the credit signal, decreasing the counting threshold corresponding to the state counting value of the one of the plurality of master modules by the slave module.

20. The credit allocation method as claimed in claim 19, wherein an amplitude that the slave module increases the counting threshold is greater than an amplitude that the slave module decreases the counting threshold.

* * * * *